UNITED STATES PATENT OFFICE.

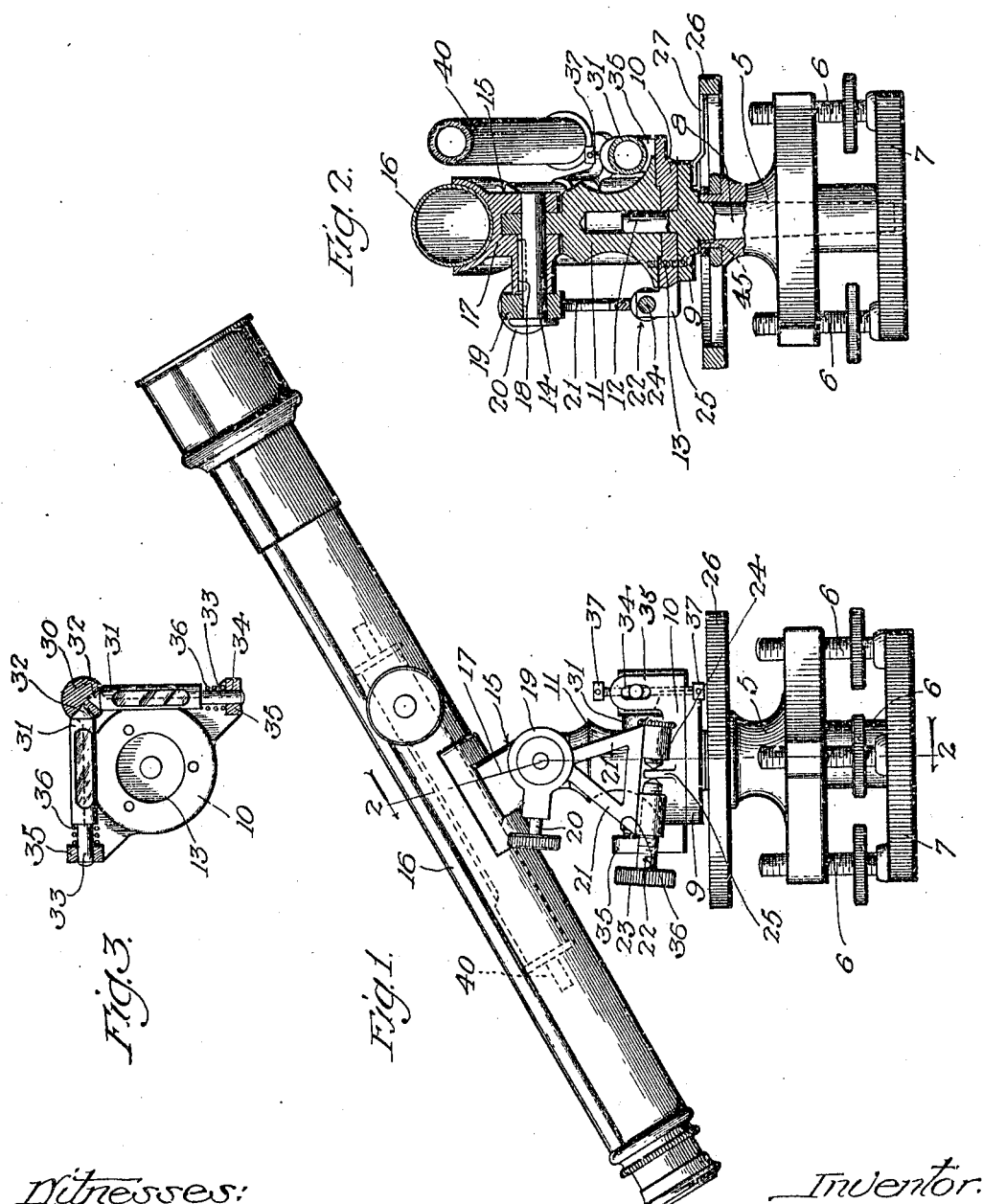

ADOLF FRESE, OF LOS ANGELES, CALIFORNIA.

COMBINED TRANSIT AND LEVEL.

955,958.  Specification of Letters Patent.  Patented Apr. 26, 1910.

Application filed September 7, 1909. Serial No. 516,562.

*To all whom it may concern:*

Be it known that I, ADOLF FRESE, a citizen of the United States, residing at Los Angeles, in the county of Los Angeles and State of California, have invented new and useful Improvements in a Combined Transit and Level, of which the following is a specification.

The prime object of this invention is to provide a simple, light and accurate instrument which combines the features of both transit and level; the especial object being the provision of such mechanism as to allow the ready change from one type of instrument to the other, without the addition of any complicated, cumbersome and expensive parts. In accomplishing these objects I have provided an instrument which possesses all the facilities of a transit. In the present showing I have illustrated an instrument with only facilities for angle reading; but it is not impossible, and, in fact, is sometimes of great utility to combine a compass and scale with the instrument.

To change the instrument for use as a level it is only necesasry to set the telescope level in any one direction by means of the tangent screw provided. The frame of the instrument having previously been leveled, the telescope is then level in any of its positions about the vertical axis of the instrument.

In connection with this instrument I have also evolved a simple and efficient method of construction, arrangement and assembling of the different parts, together with a simple and direct means of securing the level bubbles to the frame of the instrument.

In the accompanying drawings, Figure 1 is a side elevation of my improved instrument. Fig. 2 is a transverse vertical section taken on line 2—2 of Fig. 1. Fig. 3 is a plan view of the level bubble supporting member.

Referring to the drawings 5 designates the base of the instrument which is carried and adjustably supported by means of leveling screws 6 which rest upon plate 7. Plate 7 is adapted to be connected to the usual tripod head, or any other desired supporting means. Center or axis 8 is mounted in base 5 so as to rotate therein on a vertical axis. At the upper end of this center or axis is a flange 9 upon which directly rests the spirit level supporting member 10. Upon this member 10 head 11 rests, flange 9, member 10, and head 11 being secured together by means of screws. An upper extension 12 of the axis passes through member 10 and into head 11, and head 11 is recessed into member 10 as at 13, this construction keeping head 11 and axis 8 accurately concentric. Screws 45, one of which is shown in Fig. 2, pass through flange 9 and member 10 into head 11, thus securing the three pieces together. At its upper end head 11 carries a horizontal axis 14 which forms in effect the center of a hinged joint 15 which supports telescope tube 16 above the head. Member 17, which is secured directly to the telescope tube, is accurately fitted upon the upper end of head 11 so that the telescope tube swings on axis 14 in a truly vertical plane. Member 17 is secured to axis 14 by means of a key 18, so that the axis and tube must turn together.

Mounted upon one end of axis 14 is a collar 19 carrying a set screw 20 adapted to rotatively secure it to the axis. A small depending frame 21 is formed, preferably, integrally with collar 19 and carries at its lower end a tangent screw combination 22. The screw 23 and the spring pressed plunger 24 of the tangent screw combination press directly against and operate upon a lug 25 which extends from spirit level supporting member 10.

Mounted upon base 5 is a graduated circle 26 which is adapted to be read in combination with the divisions on vernier member 27 secured to the underside of flange 9. Any rotation of main vertical axis 8 will move vernier member 27 around the graduated circle, the circle being so mounted upon base 5 that it may be turned to start the reading of any desired angle at the zero point on the circle; or the angle may be read as the difference between two readings.

The spirit level carrying member 10 is provided with a cylindrical supporting boss 30 on one side, into which boss the ends of both spirit levels 31 project. The ends are formed conically as at 32 and fit into conical apertures in the boss, the ends and apertures being so arranged that the opposite ends of the level may be adjusted vertically so that the levels indicate correctly. The other ends of the level are reduced in diameter as at 33 and project through vertically elongated slots 34 in bosses 35. Springs 36 keep the levels pressed into the conical apertures in boss 30 and screws 37 afford means for adjusting them.

Telescope tube 16 is equipped in the usual manner, with the exception that spirit level 40 is secured to its side instead of to its top. By the aid of this spirit level the telescope tube may be set in a precisely horizontal position.

When used as a transit, set screw 20 is loosened, allowing the telescope to turn freely on horizontal axis 14. The instrument is leveled up in the usual manner and also used in the usual manner.

For use as a level the instrument is leveled up in the usual manner and the telescope also placed in an approximately horizontal position. Set screw 20 is tightened down upon axis 14 and the axis and telescope are then finally adjusted to the true horizontal by means of the tangent screw. After this adjustment the telescope will be in a truly horizontal position in each of its positions about the vertical axis, it being only necessary to set the telescope level in a single position.

Having described my invention, I claim:—

1. An instrument of the class described, comprising a base, leveling screws supporting the base, a vertical axis mounted in the base, means mounted upon the axis and the base for indicating the amount of relative rotation between the same, a flange upon the axis, a spirit level carrying member mounted upon the flange, a pair of spirit levels mounted upon the member, a head mounted upon the member, an extension of the vertical axis projecting upwardly from the flange through the spirit level carrying member and into the head, a horizontal axis carried by the upper end of the head, a telescope tube carrying member rigidly mounted upon the axis, a telescope tube carried by the last named member, a spirit level mounted upon the telescope tube, a lug projecting from the spirit level carrying member, and a tangent screw means mounted upon the horizontal axis and adapted to be rigidly secured thereto and operating in combination with the lug.

2. In an instrument of the class described, a vertical axis, a flange on the upper end of the axis, a projection of the axis above the flange, a level carrying member having an aperture adapted to fit over the axis projection, the member fitting upon the flange, a boss projecting downwardly from the member, the boss having a pair of conical depressions in its surface with axes lying in a horizontal plane and at right angles to each other, a pair of level bubble members having conical ends adapted to fit into the conical depressions, means to vertically adjust the other ends of the bubble members, and resilient means to press the conical ends of the bubble members into the conical depressions in the boss.

3. In an instrument of the class described, a vertical axis, a level carrying member mounted upon the vertical axis, a boss projecting from the level carrying member and having a pair of conical depressions, the axes of the cones being horizontal, a pair of level bubble members having conical ends adapted to fit into the conical depressions, and means to press the conical ends of the bubble members into the conical depressions.

4. In an instrument of the class described, a vertical axis, a level carrying member mounted upon the vertical axis, a boss projecting from the level carrying member and having a pair of conical depressions, the axes of the cones being horizontal, a pair of level bubble members having conical ends adapted to fit into the conical depressions, a pair of bosses on the member having vertical slots therein, the ends of the bubble members being adapted to pass through the slots, screws for the adjustment of the ends of the bubble members within the slots, and a spring pressing each bubble member toward the boss with the conical depressions.

In witness that I claim the foregoing I have hereunto subscribed by name this 28th day of August 1909.

ADOLF FRESE.

Witnesses:
ELWOOD H. BARKELEW,
JAS. H. BALLAGH.